(12) United States Patent
Xi et al.

(10) Patent No.: US 10,497,948 B2
(45) Date of Patent: Dec. 3, 2019

(54) FUEL CELL STACK WITH ASYMMETRICAL BIPOLAR PLATES

(71) Applicant: GM GLOBAL TECHNOLOGY OPERATIONS LLC, Detroit, MI (US)

(72) Inventors: Liang Xi, Northville, MI (US); Xi Yang, Bloomfield Hills, MI (US); Siguang Xu, Rochester Hills, MI (US); Glenn W Skala, Churchville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 158 days.

(21) Appl. No.: 15/714,267

(22) Filed: Sep. 25, 2017

(65) Prior Publication Data
US 2019/0097248 A1    Mar. 28, 2019

(51) Int. Cl.
| | |
|---|---|
| *H01M 8/0276* | (2016.01) |
| *H01M 8/1018* | (2016.01) |
| *H01M 8/2418* | (2016.01) |
| *H01M 8/0284* | (2016.01) |
| *H01M 8/0297* | (2016.01) |
| *H01M 8/0273* | (2016.01) |

(52) U.S. Cl.
CPC ....... *H01M 8/0276* (2013.01); *H01M 8/0273* (2013.01); *H01M 8/0284* (2013.01); *H01M 8/0297* (2013.01); *H01M 8/1018* (2013.01); *H01M 8/2418* (2016.02); *H01M 2008/1095* (2013.01)

(58) Field of Classification Search
CPC ............ H01M 8/0258; H01M 8/0267; H01M 8/0297; H01M 8/0202; H01M 8/0276
See application file for complete search history.

(56) References Cited

U.S. PATENT DOCUMENTS

| | | | | |
|---|---|---|---|---|
| 5,346,661 | A | * | 9/1994 | Dunyak .............. B29C 67/0044 156/291 |
| 8,227,145 | B2 | | 7/2012 | Keyser et al. |
| 8,371,587 | B2 | | 2/2013 | Fly et al. |
| 2003/0194595 | A1 | * | 10/2003 | Gibb ................... H01M 8/0254 429/514 |
| 2004/0234831 | A1 | * | 11/2004 | Kobayashi .......... H01M 8/0273 429/483 |
| 2005/0048351 | A1 | * | 3/2005 | Hood .................. H01M 8/0258 429/514 |
| 2007/0231619 | A1 | * | 10/2007 | Strobel .................... C25B 9/203 429/457 |
| 2009/0239128 | A1 | * | 9/2009 | Keyser ................ H01M 8/0204 429/432 |
| 2016/0218376 | A1 | * | 7/2016 | Liu ..................... H01M 8/0258 |
| 2017/0084929 | A1 | * | 3/2017 | Xu ...................... H01M 8/0282 |
| 2017/0229714 | A1 | * | 8/2017 | Beutel ................ H01M 8/0247 |
| 2017/0229717 | A1 | * | 8/2017 | Luong ................ H01M 8/2404 |
| 2019/0088919 | A1 | * | 3/2019 | Xi ....................... H01M 8/0297 |

* cited by examiner

*Primary Examiner* — Imran Akram
(74) *Attorney, Agent, or Firm* — Quinn IP Law (57) ABSTRACT

The present disclosure provides a fuel cell stack having a plurality of bipolar plates aligned between a pair of end plates. Each of the bipolar plates further includes a first bead and a second bead. The first bead defines a first bead height, and the second bead defines a second bead height wherein the second bead height is less than the first bead height.

16 Claims, 7 Drawing Sheets

FUEL CELL STACK WITH ASYMMETRICAL BIPOLAR PLATES

TECHNICAL FIELD

The invention relates to a fuel cell system and more particularly to an improved fuel cell stack having a robust bead structure for sealing between the plates of the fuel cell stack.

BACKGROUND

Fuel cell systems are increasingly being used as a power source in a wide variety of applications. Fuel cell systems have been proposed for use in power consumers such as vehicles as a replacement for internal combustion engines, for example. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper. The DM's serve as the primary current collectors for the anode and cathode as well as provide mechanical support for the MEA. The DM's and MEA are pressed between a pair of electronically conductive plates which serve as secondary current collectors for collecting the current from the primary current collectors. The plates conduct current between adjacent cells internally of the stack in the case of bipolar plates and conduct current externally of the stack (in the case of monopolar plates at the end of the stack).

The bipolar plates typically include two thin, facing metal sheets. One of the sheets defines a flow path on one outer surface thereof for delivery of the fuel to the anode of the MEA. An outer surface of the other sheet defines a flow path for the oxidant for delivery to the cathode side of the MEA. When the sheets are joined, the joined surfaces define a flow path for a dielectric cooling fluid. The plates are typically produced from a formable metal that provides suitable strength, electrical conductivity, and corrosion resistance, such as 316 L alloy stainless steel for example.

The stack, which can contain more than one hundred plates, is compressed, and the elements held together by bolts through corners of the stack and anchored to frames at the ends of the stack. In order to militate against undesirable leakage of fluids from between the pairs of plates, a seal is often used. The seal is disposed along a peripheral edge of the pairs of plates. Prior art seals have included the use of an elastomeric material in conjunction with a bead stamped into the bipolar plate.

It would be desirable to produce a metal bead seal for sealing between plates of a fuel cell system, wherein the bead structure militates against a leakage of fluids from the fuel cell system and a cost thereof is minimized.

SUMMARY

In one embodiment of the present disclosure, a fuel cell stack is provided which includes a plurality of bipolar plates aligned between a pair of end plates. Each of the bipolar plates further includes a first bead and a second bead. The first bead defines a first bead height, and the second bead defines a second bead height wherein the second bead height is less than the first bead height.

In yet another embodiment of the present disclosure, a bipolar plate for a fuel cell stack is provided where the bipolar plate includes a first shell affixed to a second shell wherein the first and second shell define a channel therebetween. A first bead may be further defined in the first shell proximate to a first shell perimeter. The first bead further includes a first bead height. Similarly, a second bead may be defined in the second shell proximate to a second shell perimeter, and the second bead also includes a second bead height which may be less than the first bead height.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 1:
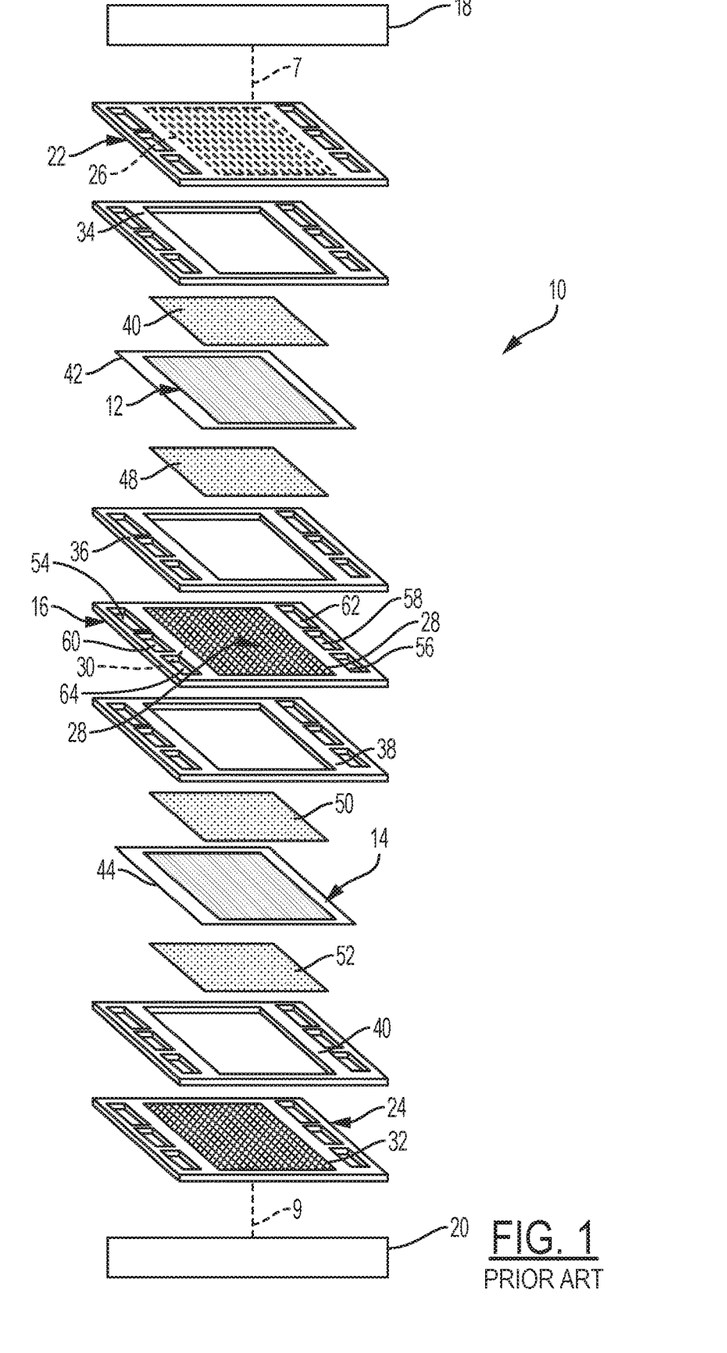
FIG. 1 is an expanded view of a traditional fuel cell stack.

FIG. 1 shows an illustrative bipolar PEM fuel cell stack 10 known in the art. For simplicity, two-cells in the stack (i.e. three bipolar plates) are detailed in FIG. 1, it being understood that a typical stack will have many more such cells and bipolar plates (for example, as further shown in FIG. 3). It is further understood that elements 7 and 9 represent additional fuel cells within the fuel cell stack 10. Although a bipolar PEM fuel cell stack is shown, it is understood that other fuel cell types and configurations may also be used without departing from the scope and spirit of the disclosure.

The illustrative fuel cell stack 10 includes a first MEA 12 and a second MEA 14, each having an electrolyte membrane disposed between an anode electrode and a cathode electrode. An electrically conductive bipolar plate 16 is disposed between the first MEA 12 and the second MEA 14. The first MEA 12, the second MEA 14, and the bipolar plate 16 are stacked together between bipolar plates 22, 24 within the fuel cell stack 10. The clamping plates 18, 20 are electrically insulated from the bipolar plates in the stack.

A working face of each of the bipolar plates 22, 24, as well as both working faces of the bipolar plate 16 include a respective flow field 26, 32, 28, 30 formed therein having a plurality of flow channels. The flow fields 26, 28, 30, 32 distribute reactants such as hydrogen and oxygen/air over the faces of the MEAs 12, 14.

Nonconductive gaskets 34, 36, 38, 40 may be respectively disposed between the bipolar plate 22 and the first MEA 12, the first MEA 12 and the bipolar plate 16, the bipolar plate 16 and the second MEA 14, and the second MEA 14 and the bipolar plate 24. The gaskets 34, 36, 38, 40 facilitate a seal and electrically insulate the end plate 22 and the first MEA 12, the first MEA 12 and the bipolar plate 16, the bipolar plate 16 and the second MEA 14, and the second MEA 14 and the bipolar plate 24.

The MEAs 12, 14 of the illustrative fuel cell stack 10 may have nonconductive subgaskets or barrier films 42, 44. The subgaskets 42, 44, either alone or employed in conjunction with the gaskets 34, 36, 38, 40, extend from the edges of the electrodes and facilitate a seal of the first MEA 12 and the bipolar plate 16 and the bipolar plate 16 and the second MEA 14. The subgaskets 42, 44 also electrically insulate the first MEA 12 and the bipolar plate 16, and the bipolar plate 16 and the second MEA 14. As a non-limiting example, the subgaskets 42, 44 may be formed respectively integral with the nonconductive gaskets 34, 36, 38, 40. The subgaskets 42, 44 may also be formed integrally with the electrolyte membrane. In other embodiments, the subgaskets 42, 44 are formed from another suitable, electrically nonconductive material and coupled to the MEAs 12, 14, respectively. Collectively, the MEAs 12, 14, the gaskets 34, 36, 38, 40, and the subgaskets 42, 44 are known as fuel cell "softgoods" or "softgood layers."

Gas-permeable DM 46, 48, 50, 52 abut respective electrodes of the first MEA 12 and the second MEA 14. The DM 46, 48, 50, 52 are respectively disposed between the end plate 22 and the first MEA 12, the first MEA 12 and the bipolar plate 16, the bipolar plate 16 and the second MEA 14, and the second MEA 14 and the bipolar plate 24.

The bipolar plates 16, 22, 24, and the gaskets 34, 36, 38, 40 each include a cathode supply aperture 54 and a cathode exhaust aperture 56, a coolant supply aperture 58 and a coolant exhaust aperture 60, and an anode supply aperture 62 and an anode exhaust aperture 64. Supply manifolds and exhaust manifolds of the fuel cell stack 10 are formed by an alignment of the respective apertures 54, 56, 58, 60, 62, 64 in the bipolar plates 16, 22, 24, and the gaskets 34, 36, 38, 40. The hydrogen gas is supplied to an anode supply manifold via an anode inlet conduit 66. The air is supplied to a cathode supply manifold of the fuel cell stack 10 via a cathode inlet conduit (not shown) at end plate 18. An anode outlet conduit and a cathode outlet conduit are also provided for an anode exhaust manifold and a cathode exhaust manifold, respectively. A coolant inlet conduit (not shown) is also provided at end plate 18 for supplying liquid coolant to a coolant supply manifold. A coolant outlet conduit (not shown) may also be provided at end plate 18 for removing coolant from a coolant exhaust manifold.

Figure 2:
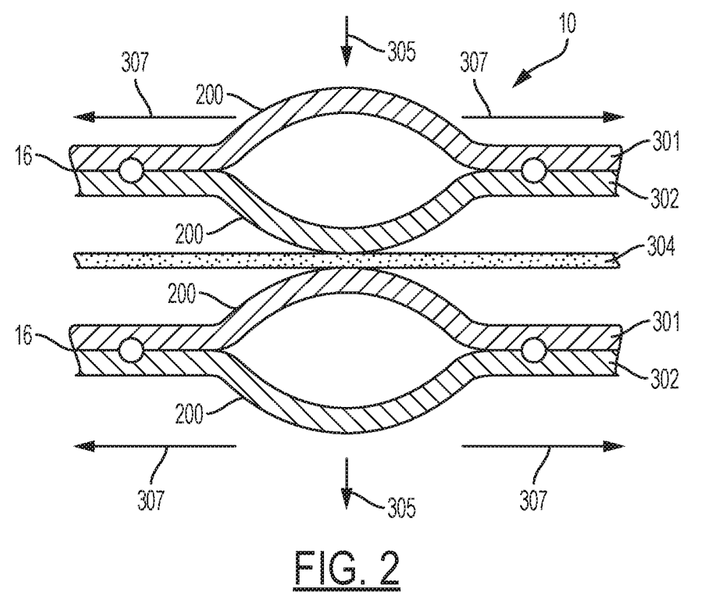
FIG. 2 is a cross sectional view of a metal bead seal in a traditional fuel cell used in the fuel cell stack of FIG. 1 prior to the application of a compression force.

With reference to FIG. 2, each of the pair of traditional bipolar plates 16, 22, 24 is formed from a first unipolar plate 301 and a second unipolar plate 302. The first unipolar plate 301 is bonded to the second unipolar plate 302. The bonded first and second unipolar plates 301, 302 form internal channels (not shown) adjacent the flowfield 28, 30 (FIG. 1) of each of the pair of bipolar plates 16 for coolant to flow therethrough for temperature regulation of the illustrative fuel cell stack 10. The first and second unipolar plates 301, 302 may be bonded by at least one of a variety of suitable means known in the art, such as by welding or by an application of an adhesive, for example. Other suitable means for bonding the first unipolar plate 301 with the second unipolar plate 302 may be selected as desired.

The bipolar plates 16, 22, 24 of the traditional fuel cell stack 10 have a softer layer 304 such as at least one of the gaskets 34, 36, 38, 40 and the subgaskets 42, 44, for example, disposed between each bipolar plate 16, 22, 24. The single bead 200 is formed on each of the pair of bipolar plates 16, 22, 24. The single bead 200 has a substantially arcuate surface as shown in FIG. 2. As a non-limiting example, the single bead 200 may be formed by a stamping operation performed on the first and second plates 301, 302. The single beads 200 of each of the pair of bipolar plates 16 sandwich the softer layer 304 when the fuel cell stack 10 is placed in the compressed state. In the compressed state, contact between the single beads 200 results.

However, as compression loads 305 (FIG. 2) are applied to the single beads of the fuel cell, the beads have a tendency to flatten given both the top and bottom plates move laterally along the lateral direction 307 as shown in FIG. 2 as the bead absorbs energy from the compression loads 305. The flattening deformation in the traditional bead of FIG. 2 may therefore compromise the fluid tight seal between two bipolar plates.

Figure 3:
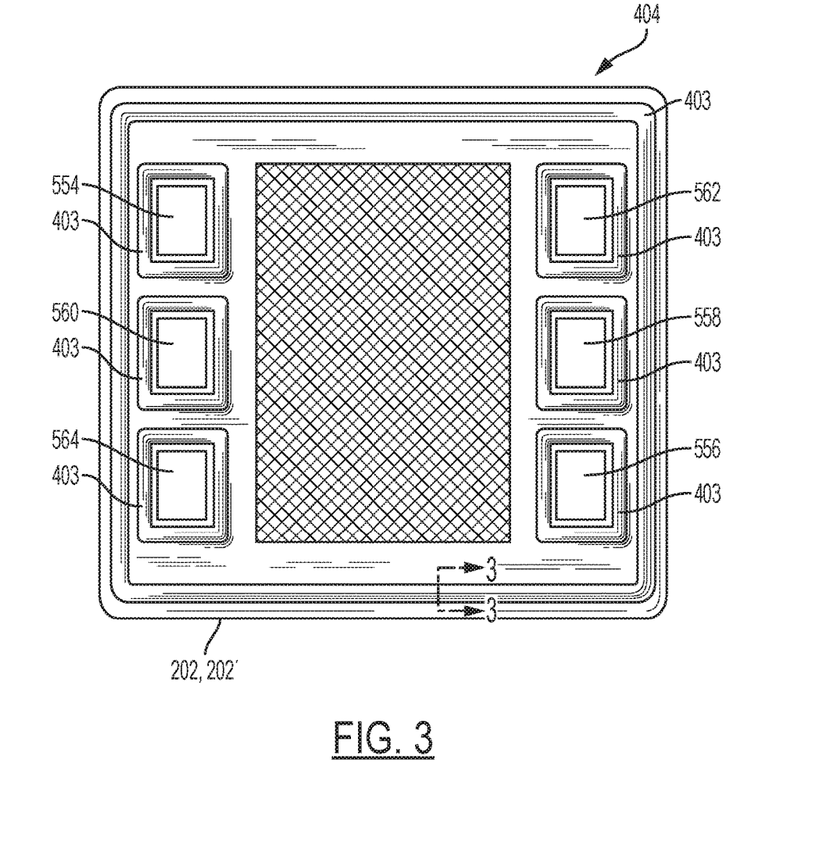
FIG. 3 is a plan view of an example, non-limiting bipolar plate according to various embodiments of the present disclosure.
Figure 7:
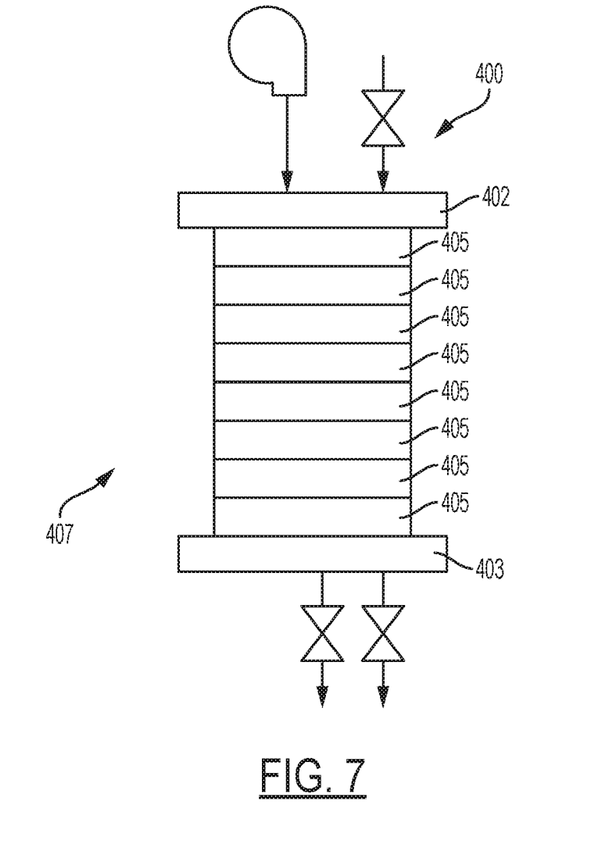
FIG. 7 is a side view of a fuel cell stack according to various embodiments of the present disclosure.

The present disclosure therefore provides a fuel cell stack 400 (FIG. 7) having a plurality 407 of fuel cells 405 having bipolar plates 404 (FIG. 3) disposed between a pair of end plates 402, 403 (FIG. 7). An example bipolar plate 404 of the present disclosure is shown in FIG. 3 in further detail. The bipolar plate 404 includes a metal bead seal 403 formed thereon. The metal bead seal 403 is typically formed on the bipolar plate 404 adjacent or proximate to the peripheral or outer edge 502 (FIG. 3) thereof. The metal bead seal 403 may also be disposed adjacent to a peripheral edge 502 of the bipolar plate 404 404 and surround at least one of the apertures 554, 556, 558, 560, 562, 564.

The present disclosure therefore provides a fuel cell stack 400 (FIG. 7) having a plurality 407 of fuel cells 405 formed by bipolar plates 404 (FIG. 2). The bipolar plates 404 may be aligned between a pair of end plates 402, 403. Each of the bipolar plates 404 further includes a first bead 406 and a second bead 410 as shown in the non-limiting examples of FIGS. 4 and 6A. It is understood that the first bead 406 and the second bead 410 may have other configurations wherein each bead may be defined by a curved concave surface or a curved convex surface—without a substantially flat configuration 422, 428 (FIG. 4) as later described herein. The first bead 406 defines a first bead height 408, and the second bead 410 defines a second bead height 412 which is less than the first bead height 408.

Figure 4:
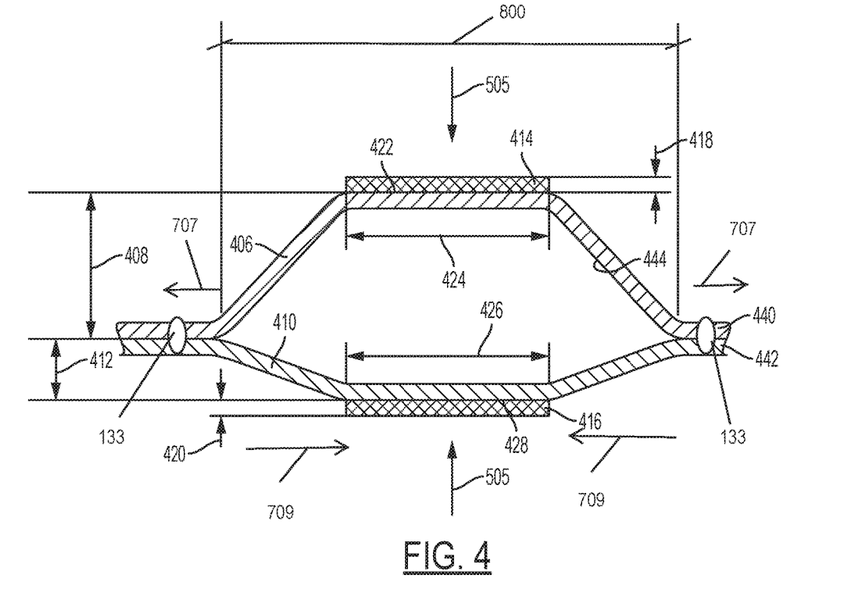
FIG. 4 is a cross sectional, partial view of an example bipolar plate proximate to the metal bead in accordance with the present disclosure.
Figure 5A:
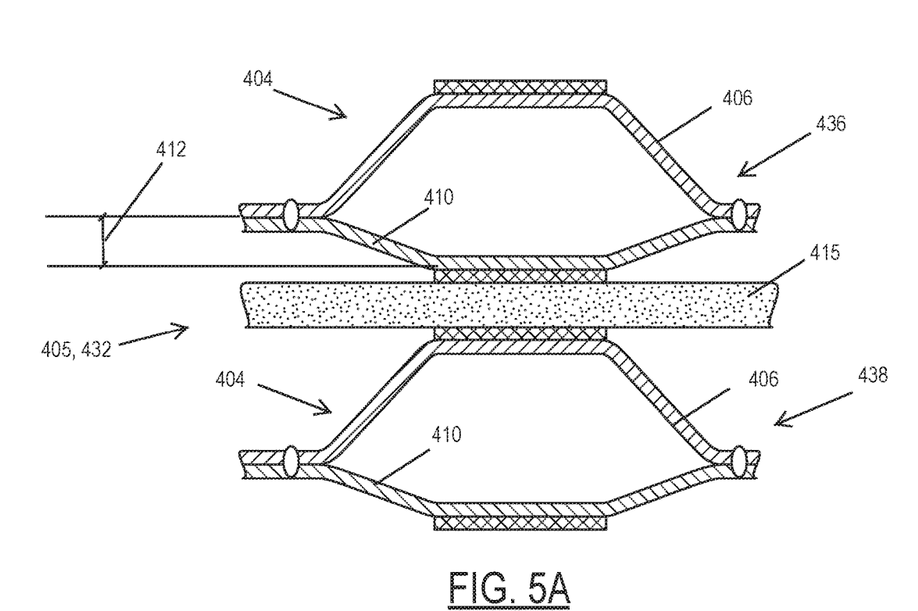
FIG. 5A is a cross sectional, partial view of an example, non-limiting fuel cell according to the present disclosure.
Figure 5B:
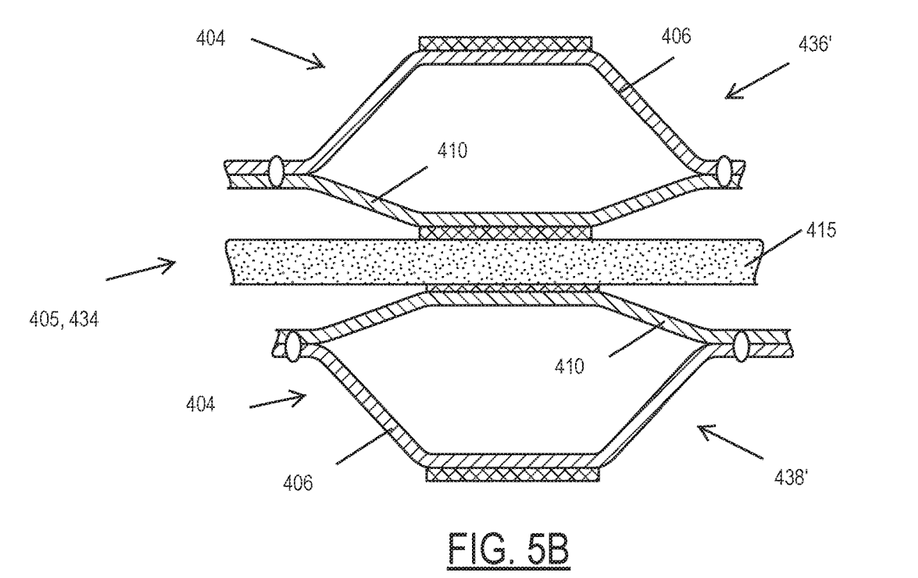
FIG. 5B a cross sectional, partial view of a second example, non-limiting fuel cell according to the present disclosure.
Figure 6A:
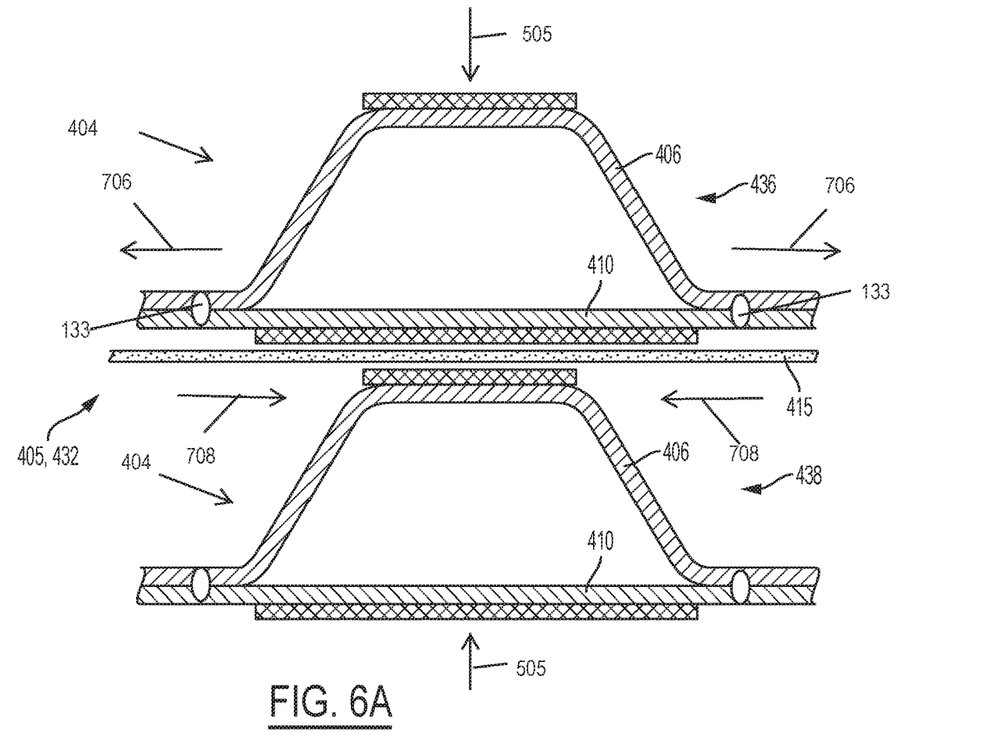
FIG. 6A is a cross sectional, partial view of a third example, non-limiting fuel cell according to the present disclosure.
Figure 6B:
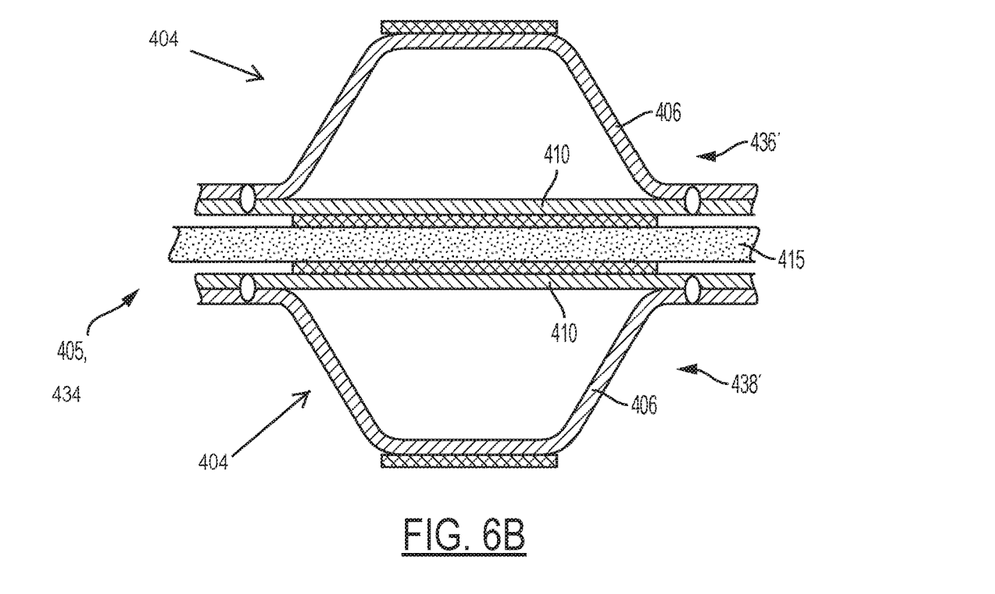
FIG. 6B is a cross sectional, partial view of a fourth example, non-limiting fuel cell according to the present disclosure.

With reference again to FIG. 4, the first bead height 408 may, but not necessarily, fall in the range of about 0.3 mm to 1.5 mm. The second bead 410 defines a second bead height 412 which falls in a range from about 0% of the first bead height 408 to about 99% of the first bead height 408. FIGS. 6A and 6B show examples of a second bead height 412 which is 0% of the first bead height 408 while FIGS. 4, 5A and 5B illustrate examples where the second bead height 412 is greater than 0% and less than 99% of the first bead height 408. Regardless, the first and second beads 406, 410 have different heights creating an asymmetric arrangement. As further shown in FIG. 4, the first bead 406 mates with the second bead 410 when the bipolar plate 404 is assembled via at least one weld 433.

As shown, the first bead 406 may, but not necessarily, include a first surface 422 defining a first surface width 424 having a substantially flat configuration 422, and the second bead 410 also may, but not necessarily, include a second surface width 426 also having a substantially flat configuration 422. In a non-limiting example, the first surface width 424 may, but not necessarily, be greater than the second surface width 426 as shown in FIG. 4.

As further shown in FIG. 4, the first bead 406 may include a first elastomer 414 having a first elastomer thickness 418 which falls in the range of about 30 microns to about 300 microns and the second bead 410 includes a second elastomer 416 having a second elastomer thickness 420 which falls in the range of about 30 microns to about 300 microns. The first and second elastomers 416 may, but not necessarily, be formed from any one or more of EPDM (Ethylene propylene diene monomer), HNBR (Hydrogenated acrylonitrile-butadiene), NBR (acrylonitrile butadiene), VMQ (silicone), FVMQ (fluorosilicone), and FKM (fluoropolymer).

Referring now to FIGS. 5A and 6A, it is understood that an example, non-limiting fuel cell stack 400 of the present disclosure may have the plurality 407 (FIG. 7) of bipolar plates 404 arranged in a first pattern 432 (FIGS. 5A and 6A) wherein the second bead 410 of a first bipolar plate 436 is configured to engage with the first bead 406 of an adjacent second bipolar plate 438 with a subgasket 415 disposed therebetween and the first pattern 432 is implemented throughout the plurality 407 of bipolar plates 404. In the example shown in FIG. 6A, the second bead 410 for each bipolar plate 404 defines a second bead height 412 which is equivalent to zero percent of the first bead height 408 while the example shown in FIG. 5A, the second bead 410 for each bipolar plate 404 defines a second bead height 412 which is greater than zero percent of the first bead height 408 and less than 99 percent of the first bead height.

Referring now to FIGS. 5B and 6B, it is understood that another example, non-limiting fuel cell stack 400 of the present disclosure may have the plurality 407 of bipolar plates 404 arranged in a second pattern 434 wherein the second bead 410 of a first bipolar plate 436' is configured to engage with the second bead 410 of an adjacent second bipolar plate 438' with a subgasket 415 disposed therebetween and the second pattern 434 is implemented throughout the plurality 407 of bipolar plates 404. Again, in the example shown in FIG. 6B, the second bead 410 for the bipolar plate 404 defines a second bead height 412 which is equivalent to zero percent of the first bead height 408 while the example shown in FIG. 5B, the second bead 410 for each bipolar plate 404 defines a second bead height 412 which is greater than zero percent of the first bead height 408 and less than 99 percent of the first bead height.

Referring back to FIGS. 3-6A, a bipolar plate 404 of the present disclosure may include a first shell 440 affixed to a second shell 442 wherein the first and second shell 442 define a channel therebetween. A first bead 406 may be further defined in the first shell 440 proximate to a first shell perimeter 202. The first bead 406 further includes a first bead height 408. Similarly, the second bead 410 may be defined in the second shell 442 proximate to a second shell perimeter 202', and the second bead 410 also includes a second bead height 412 which is less than the first bead height 408. Thus, for an asymmetrical bead according to the embodiment of FIG. 6A where the second bead height is substantially equivalent to zero percent of the first bead height, the base of both the first bead 406 and the second bead 410 are urged to laterally expand in opposite directions as shown in FIG. 6A noting that welds 133 constrain the metal bead seal in the lateral direction. As a result of the lateral constraint and the opposing forces in the metal bead seal, the metal bead seal according to FIG. 6A provides improved performance with respect to higher buckling load resistance—due to structural stiffness.

In the alternative embodiment shown in FIG. 4 where the second bead height is less than 99 percent of the first bead height yet greater than zero percent of the first bead height, then the first bead and the second bead are urged to laterally expand according to different magnitudes when a compression load 505 is applied as shown in FIG. 4. As a result, two reaction forces 707 and 709 are generated in opposing directions as shown. For example, lateral forces 707 may be substantially less than lateral forces 709 as shown in FIG. 4. However, similar to the embodiment shown in FIG. 6A, both the first bead and the second beads 406, 410 in this alternative embodiment are laterally constrained due to welds 133. Moreover, it is further understood that the magnitude of reaction forces 707 and 709 (FIG. 4) may be smaller than the reaction forces of 706 and 708 (FIG. 6A).

Due to the lateral resistance to bead expansion, the metal bead seal according to FIG. 4 also provides improved performance with respect to higher buckling load resistance. It is understood that in the first and second bead configuration shown in FIG. 4A where the second bead height 410 is initially larger than zero percent of the first bead height, the second bead height 410 may be compressed such that the second bead height 410 is reduced to approximately zero percent of the first bead height 408. After that the aforementioned event (where the metal bead seal of FIG. 4A initially absorbs energy from the load 505), the lateral expansion and mechanical behavior of the metal bead seal will be the same as that shown in the embodiment shown in FIG. 6A where the second bead height is approximately zero.

Therefore, in summary, with respect to the various example non-limiting embodiments of the present disclosure shown in FIG. 4 and FIG. 6A, the first bead 406 and the second bead 410 (which have different heights) may undergo different deformation rates for both height reduction and lateral expansion even though the first bead and the second bead are laterally affixed via at least two welds 133.

Referring again to FIG. 4, the first bead 406 in the bipolar plate 404 includes a first bead height 408 which may, but not necessarily, fall in the range of about 0.3 mm to about 1.5 mm. It is further understood that, prior to application of load 505, the bead width 800 (shown as an example in FIG. 4) for the various embodiments of the present disclosure may fall within the range of about 1.0 mm to 5.0 mm. Similarly, the second bead 410 in the bipolar plate 404 may define a second bead height 412 which falls in a range from about 0% of the first bead height 408 to about 99% of the first bead height 408. In the example of FIG. 4, the second bead height 412 is approximately 25% of the first bead height 408 while the example bipolar plate 404 shown in FIG. 6A shows a second bead height 412 which is approximately 0% of the first bead height 408.

With reference to FIG. 4, the first bead 406 may, but not necessarily, include a first surface 422 which includes a first surface width 424. The first surface 422 may, but not necessarily, have a substantially flat configuration 423. Also, the second bead 410 may but not necessarily define a second surface 424 having a substantially flat configuration 425. It is also understood that the second surface 424 defines a second surface width 426. It is understood that the first surface width 424 may, but not necessarily be greater than the second surface width 426.

As shown in the bipolar plates 404 of FIGS. 4 and 6A, the first bead 406 includes a first elastomer 414 disposed on the first surface 422. The first elastomer 414 may have a first elastomer thickness 418 which falls in the range of about 30 microns to about 300 microns. Also, the second bead 410 may, but not necessarily, includes a second elastomer 416 having a second elastomer thickness 420 which falls in the range of about 30 microns to about 300 microns. While not required, the first and second elastomer 416s may be formed from any one or more of EPDM, HNBR, NBR, VMQ, FVMQ, and FKM.

As shown in the example first pattern 432 shown in FIG. 6A, the second bead 410 of the bipolar plate 404 may be configured to engage with the first bead 406 of an adjacent bipolar plate 438 with a subgasket 415 disposed therebetween. Alternatively, as shown in the example second pattern 434 shown in FIG. 6B, the second bead 410 of the bipolar plate 404 may be configured to engage with the second bead 410 of an adjacent second bipolar plate 404 with a subgasket 415 disposed therebetween. The first pattern 432 or the second pattern 434 may be implemented throughout the fuel cell stack 400 of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fuel cell stack comprising:
a plurality of end plates; and
a plurality of bipolar plates aligned between the plurality of end plates, each of the bipolar plates including:
a first bead having a first bead height, wherein the first bead includes a first surface defining a first surface width having a substantially flat configuration;
a second bead having a second bead height which is less than the first bead height, wherein the second bead includes a second surface defining a second surface width having a substantially flat configuration;
a first elastomer disposed on the first bead and having an elastomer thickness and a first elastomer width that matches the first surface width;
a second elastomer disposed on the second bead and having the elastomer thickness and a second elastomer width that matches the second surface width, wherein the second elastomer width is greater than the first elastomer width; and
at least two welds affixing the first bead and the second bead together in a lateral direction, wherein the at least two welds are formed adjacent to and on opposite lateral sides of the first bead and the second bead.

2. The fuel cell stack as defined in claim 1 wherein the first bead height falls in the range of about 0.3 millimeters to 1.5 millimeters.

3. The fuel cell stack as defined in claim 2 wherein the second bead height falls in a range from about 0% of the first bead height to about 99% of the first bead height.

4. The fuel cell stack as defined in claim 1 wherein the first bead mates with the second bead when the bipolar plate is assembled.

5. The fuel cell stack as defined in claim 1 wherein the elastomer thickness falls in the range of about 30 microns to about 300 microns.

6. The fuel cell stack as defined in claim 1 wherein the first elastomer and the second elastomer are formed from any one or more of ethylene propylene diene monomer, hydrogenated acrylonitrile-butadiene, acrylonitrile butadiene, silicon, fluorosilicone and fluoropolymer.

7. The fuel cell stack as defined in claim 1 wherein the second bead of a first bipolar plate is configured to engage with the first bead of an adjacent second bipolar plate with a subgasket disposed therebetween.

8. The fuel cell stack as defined in claim 1 wherein the second bead of a first bipolar plate is configured to engage with the second bead of an adjacent second bipolar plate with a subgasket disposed therebetween.

9. The fuel cell stack as defined in claim 1 wherein the second bead height is greater than 0% of the first bead height while uncompressed, and zero millimeters while compressed between the plurality of end plates.

10. A bipolar plate comprising:
a first shell affixed to a second shell;
a first bead defined in the first shell proximate to a first shell perimeter, the first bead defining a first bead height, wherein the first bead includes a first surface defining a first surface width having a substantially flat configuration;
a second bead defined in the second shell proximate to a second shell perimeter, the second bead defining a second bead height which is less than the first bead height, wherein the second bead includes a second surface defining a second surface width having a substantially flat configuration;
a first elastomer disposed on the first bead and having an elastomer thickness and a first elastomer width that matches the first surface width;
a second elastomer disposed on the second bead and having the elastomer thickness and a second elastomer width that matches the second surface width, wherein the second elastomer width is greater than the first elastomer width; and
at least two welds affixing the first bead and the second bead together in a lateral direction, wherein the at least two welds are formed adjacent to and on opposite lateral sides of the first bead and the second bead.

11. The bipolar plate as defined in claim 10 wherein the first bead height falls in the range of about 0.3 millimeters to 1.5 millimeters.

12. The bipolar plate as defined in claim 11 wherein the second bead height falls in a range from about 0% of the first bead height to about 99% of the first bead height.

13. The bipolar plate as defined in claim 10 wherein the elastomer thickness falls in the range of about 30 microns to about 300 microns.

14. The bipolar plate as defined in claim 10 wherein the first elastomer and the second elastomer are formed from any one or more of ethylene propylene diene monomer, hydrogenated acrylonitrile-butadiene, acrylonitrile butadiene, silicon, fluorosilicone and fluoropolymer.

15. The bipolar plate as defined in claim 10 wherein the second bead is configured to engage with the first bead of an adjacent bipolar plate with a subgasket disposed therebetween.

16. The bipolar plate as defined in claim 10 wherein the second bead of is configured to engage with the second bead of an adjacent second bipolar plate with a subgasket disposed therebetween.

* * * * *